(12) United States Patent
Cai et al.

(10) Patent No.: US 10,809,172 B2
(45) Date of Patent: Oct. 20, 2020

(54) SYSTEMS, METHODS, AND DEVICES FOR SENSING PARTICULATE MATTER

(71) Applicant: Honeywell International Inc., Morris Plains, NJ (US)

(72) Inventors: Kevin Cai, Shanghai (CN); Junfeng Wang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 232 days.

(21) Appl. No.: 16/063,064

(22) PCT Filed: Dec. 16, 2015

(86) PCT No.: PCT/CN2015/097546
§ 371 (c)(1),
(2) Date: Jun. 15, 2018

(87) PCT Pub. No.: WO2017/101038
PCT Pub. Date: Jun. 22, 2017

(65) Prior Publication Data
US 2020/0064250 A1    Feb. 27, 2020

(51) Int. Cl.
*G01N 15/06* (2006.01)
*G01N 15/02* (2006.01)
*G01N 15/00* (2006.01)

(52) U.S. Cl.
CPC ......... *G01N 15/06* (2013.01); *G01N 15/0205* (2013.01); *G01N 2015/0046* (2013.01); *G01N 2015/025* (2013.01)

(58) Field of Classification Search
CPC ............. G01N 15/06; G01N 2001/245; G01N 15/1459; G01N 15/1436; G01N 15/1429;
(Continued)

(56) References Cited

U.S. PATENT DOCUMENTS 4,197,013 A * 4/1980 Van Ackeren ....... G01N 21/534
                                                             250/252.1
5,426,501 A   6/1995 Hokanson et al.
(Continued)

FOREIGN PATENT DOCUMENTS

CN    1800820 A    7/2006
CN  104316443 A    1/2015

OTHER PUBLICATIONS

International Preliminary Report on Patentability for Application PCT/CN2015/097546, dated Sep. 6, 2016, 5 pages.
(Continued)

*Primary Examiner* — Hoa Q Pham
(74) *Attorney, Agent, or Firm* — Alston & Bird LLP

(57) ABSTRACT

A system for sensing particulate matter receives a first plurality of electronic signals from a photodetector over a period of time, the first plurality of electronic signals associated with a first plurality of particles, wherein each of the first plurality of electronic signals has a respective amplitude, sorts the first plurality of electronic signals into a plurality of amplitude levels, determines a respective quantity of signals associated with each amplitude level, determine an average summation of the first plurality of electronic signals, performs a calibration using the average summation, receives a second plurality of electronic signals from the photodetector over a period of time subsequent to the calibration, the second plurality of electronic signals associated with a second plurality of particles, and determines a mass concentration of the second plurality of particles based on the second plurality of electronic signals.

10 Claims, 2 Drawing Sheets

(58) Field of Classification Search
CPC ........... G01N 15/0205; G01N 15/0255; G01N 2015/1043; G01N 2015/0096; G01N 2015/1402; G01N 2015/0216; G01N 2015/1493; G01N 2015/0222; G01N 2015/1497; G01N 21/53; G06K 9/2027; G06K 9/00147; G06K 9/00134
USPC .................... 356/335–343, 73; 250/573, 574
See application file for complete search history.

(56) References Cited

U.S. PATENT DOCUMENTS

| | | | |
|---|---|---|---|
| 7,049,824 B2* | 5/2006 | Shabino | G01N 1/06 324/464 |
| 7,927,408 B2* | 4/2011 | Sheoran | B01D 45/04 96/397 |
| 8,243,274 B2 | 8/2012 | Aiken et al. | |
| 8,813,540 B2* | 8/2014 | Dantler | G01N 1/14 340/627 |
| 10,094,776 B2* | 10/2018 | Yang | G01N 15/0205 |
| 10,215,699 B2* | 2/2019 | Cai | G01N 15/1459 |
| 10,509,976 B2* | 12/2019 | Lewis | G01N 15/1463 |
| 10,564,086 B2* | 2/2020 | Takasu | G01N 15/06 |
| 2004/0159799 A1 | 8/2004 | Saccomanno | |
| 2013/0195245 A1* | 8/2013 | Sivathanu | G01N 23/044 378/54 |
| 2015/0253165 A1* | 9/2015 | Ajay | G01N 1/24 73/28.01 |
| 2016/0349168 A1* | 12/2016 | Takasu | G01N 15/06 |
| 2018/0017488 A1* | 1/2018 | Yang | G01N 15/0255 |
| 2019/0012903 A1* | 1/2019 | Cai | G08B 29/20 |

OTHER PUBLICATIONS

International Search Report and Written Opinion for Application PCT/CN2015/097546, dated Sep. 6, 2016, 8 pages.

* cited by examiner

SYSTEMS, METHODS, AND DEVICES FOR SENSING PARTICULATE MATTER

TECHNICAL FIELD

The present disclosure relates to systems, methods, and devices for sensing particulate matter.

BACKGROUND

A particulate matter (e.g., dust) sensor can be used in indoor air indicators, air cleaners, and air filters, among other air devices. Dust sensors can be based on light-scattering principles, for instance.

In some previous approaches, dust sensors may use one or more light emitting diodes (LEDs). These sensors may yield inaccuracies, instability, and/or inconsistency due to their design, calibration method(s), and/or simplistic operation. Thus, LED approaches may not be suitable for determination and digital display of dust mass concentration.

Previous approaches to dust sensors using use one or more lasers may exhibit increased accuracy, stability and/or consistency compared to LED approaches, but may be prohibitively expensive.

DETAILED DESCRIPTION

Figure 1:
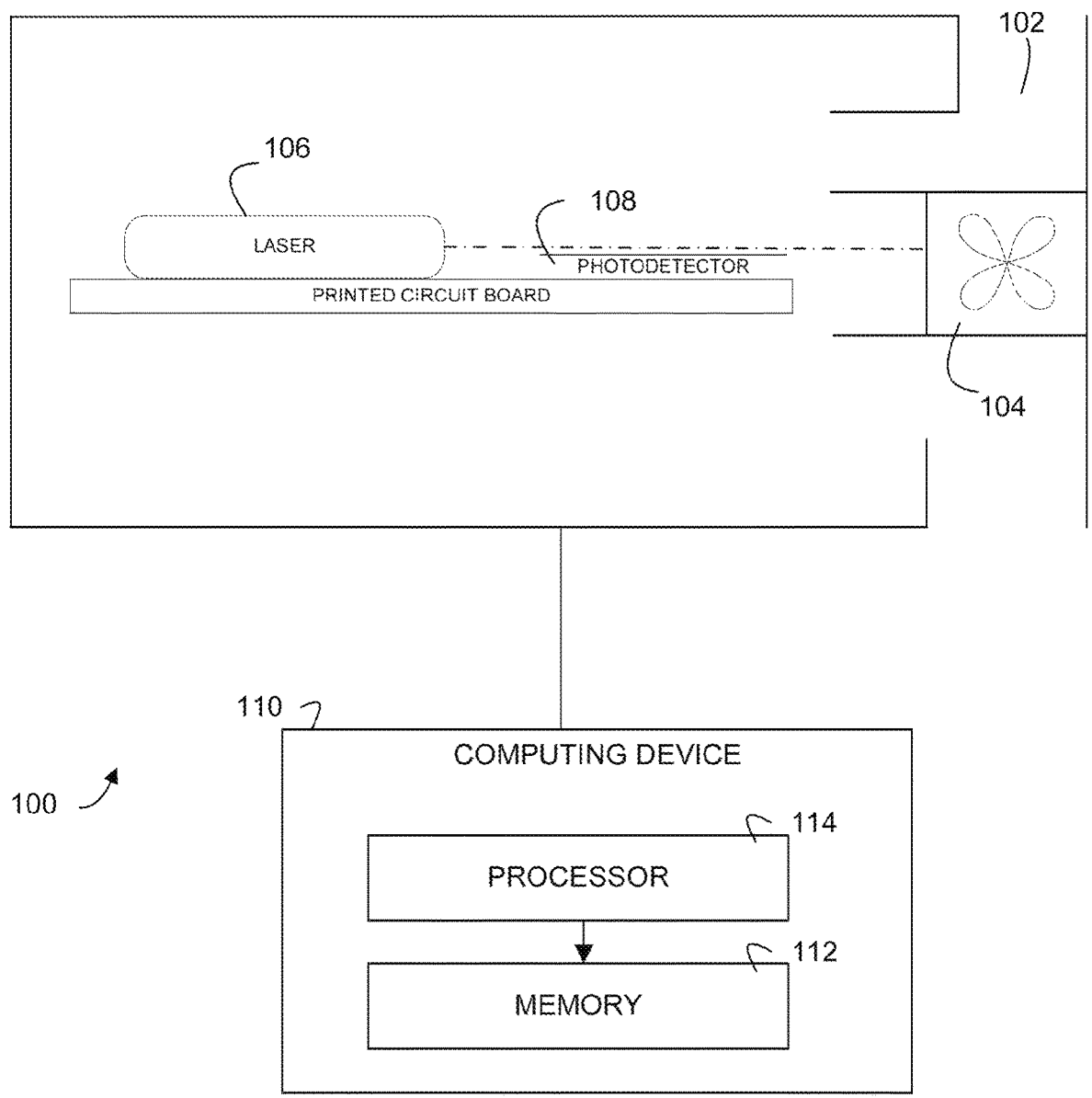
FIG. 1 illustrates a system for sensing particulate matter in accordance with one or more embodiments of the present disclosure.

Systems, methods, and devices for sensing particulate matter are described herein. For example, one or more embodiments includes a computing device having a processor and a memory storing instructions which, when executed by the processor, cause the processor to: receive a first plurality of electronic signals from a photodetector over a particular period of time, the first plurality of electronic signals associated with a first plurality of particles, wherein each of the first plurality of signals has a respective amplitude, sort the first plurality of signals into a plurality of amplitude levels, determine a respective quantity of signals associated with each amplitude level, determine an average summation of the first plurality of signals, perform a calibration using the average summation, receive a second plurality of electronic signals from the photodetector over a period of time subsequent to the calibration, the second plurality of electronic signals associated with a second plurality of particles, and determine a mass concentration of the second plurality of particles based on the second plurality of electronic signals.

Particulate matter (sometimes referred to herein as "dust") is a particle pollution that can be a mixture of solids and/or liquid droplets in the air. Some particles can be released directly from a specific source, while others form via complex chemical reactions in the atmosphere. The particulate matter can come in a variety of range sizes, including coarse dust particles and/or fine particles. For example, particles less than or equal to 10 micrometers in diameter are small particles which can enter the lungs, potentially causing serious health problems. Particles less than 2.5 micrometers in diameter ($PM_{2.5}$) may be classified as "fine" particles and may pose the greatest health risks.

Dust sensors in accordance with the present disclosure can provide improved accuracy and/or performance for detecting fine particulate matter (e.g., $PM_{2.5}$) while providing a digital display of meaningful air quality and/or air pollution levels. Embodiments of the present disclosure can provide accuracy, stability, and/or consistency that exceeds those of LED-based sensors. Additionally, embodiments herein can be less costly than previous laser-based sensors.

Embodiments of the present disclosure can a reading of mass concentration using a particle matter 2.5 ($PM_{2.5}$) reading. That is, the air quality and/or air pollution can be calculated as a mass concentration of the fine particles. The mass concentration, air quality, and/or pollution can be provided via a digital display, for instance.

Embodiments of the present disclosure can include a laser diode, a photodetector, an air fluid tunnel, and a fan for air flow control. A laser may be used, rather than an LED, because laser light may exhibit increased convergence and/or light intensity. Thus, the light scattered by the dust particles may take the form of a plurality of pulses over a given observation period, whereas LED designs may only receive envelopes of light signals over the observation period, which may be less indicative of an amount of particles in the air. Embodiments herein can include a device, such as a controller and/or computing device, which receives the pulses and transforms information contained in the pulses into mass concentration for digital display.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of spikes" can refer to one or more spikes.

FIG. 1 illustrates a system 100 for sensing particulate matter in accordance with one or more embodiments of the present disclosure. The system 100 can be (or be a portion of) a particulate matter sensor (alternatively referred to herein as a "dust sensor").

The system 100 can include an air fluid tunnel 102, which is herein referred to as "duct 102." The duct 102 can have an inlet and an outlet, for instance. The system 100 can include a fan 104. The fan 104 can draw air (and particulate matter carried by the air) into the duct 102. The fan 104 can be used to direct the air past a region of the system 100 where the particulate matter is sensed.

The system 100 can include a laser diode 106, referred to herein as "laser 106." The laser 106 can generate a beam of light. In some embodiments, the beam of light can be collimated and/or focused. It is noted that embodiments of the present disclosure do not limit the laser 106 to a particular type of laser. Additionally, though one laser 106 is shown, embodiments of the present disclosure can utilize more than one laser.

The system 100 can include a photodetector 108. The photodetector 108 is a device that receives one or more light signals and transforms the light signal(s) into electronic signal(s). Embodiments of the present disclosure 108 do not limit the photodetector 108 to a particular type of photodetector. In some embodiments, the system 100 can be contained in an enclosure. For instance the enclosure can be approximately 2 centimeters by 2 centimeters by 1 centimeter in dimension, though embodiments of the present disclosure are not so limited.

Particulate matter in air, herein referred to as "dust" can enter the duct 102, drawn in by the fan 104, for instance. Thereafter, the dust can travel into a path of the beam of the laser 106. The laser beam light can scatter and/or reflect off of the dust. The scattered light signals can be received by the photodetector 108. The photodetector 108 can transform the scattered light signals into electronic signals.

In some embodiments, the laser 106, the fan 104, and/or the photodetector 108 can be controlled by a computing device (e.g., microprocessor) 110. The computing device 110 can execute instructions (e.g., implemented as software and/or firmware) to control the laser 106, the fan 104, and/or the photodetector 108. Further, as discussed herein, the computing device 110 can convert the electronic signals received from the photodetector 108 to determined mass concentration of the dust. The computing device 110 can allow the display of the determined mass concentration. That is, in some embodiments, the system 100 can include a display configured to display a determined mass concentration of dust.

The computing device 110 can include a memory 112. The memory 112 can be any type of storage medium that can be accessed by a processor 114 to perform various examples of the present disclosure. For example, the memory 112 can be a non-transitory computer readable medium having computer readable instructions (e.g., computer program instructions) stored thereon that are executable by the processor 114 to receive a number of electronic signals.

The memory 112 can be volatile or nonvolatile memory. The memory 112 can also be removable (e.g., portable) memory, or non-removable (e.g., internal) memory. For example, the memory 454 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although the memory 112 is illustrated as being located within the computing device 110, embodiments of the present disclosure are not so limited. For example, the memory 112 can also be located internal to another computing resource (e.g., enabling computer readable instructions to be downloaded over the Internet or another wired or wireless connection).

In addition, though the computing device 110 is illustrated as being located external to the enclosure housing the duct 102, the fan 104, the laser 106, and the photodetector 108, in some embodiments, the computing device 110 can be located inside (or partially inside) the enclosure.

As previously discussed, the computing device 110 can receive electronic signals from the photodetector 108. In some embodiments, the computing device 110 can receive a first plurality of electronic signals from the photodetector 108 over a particular period of time, the first plurality of electronic signals associated with a first plurality of particles, wherein each of the first plurality of signals has a respective amplitude. An analog to digital converter (ADC) can be located on a same printed circuit board (PCB) as the photodetector, for instance, and can sample the electronic signals.

Each signal can have a unique shape consisting of a positive voltage crest and a negative voltage crest. Because the ADC is single-ended, for instance, it may only sample voltages above zero. Therefore, there may be a DC offset baseline in between the positive (upward) and negative (downward) crests. The computing device 110 can determine the DC offset by averaging a plurality of samples (received signals) when the laser 106 is turned down to a power level below a particular threshold and the signal is not scattered, for instance. Then, peak values of the signals can be tracked when the signal voltage crosses the DC offset plus a predefined "noise" threshold. In some embodiments, the noise threshold can be determined to be a voltage level that is not exceeded by any noise signals over a particular period of time. If a positive crest and a negative crest are received, and a signal duration threshold is exceeded, the signal can be deemed to be a valid signal representative of a particle. In some embodiments, the signal duration (pulse width) threshold can be set at 50 microseconds. Voltage amplitude information associated with the signal can be determined and stored, for instance.

Computing device 110 can thus determine peak amplitudes of each of the received first plurality of signals. Computing device 110 can sort the first plurality of signals into a plurality of amplitude levels (sometimes referred to as "bins"). The peak amplitudes can be sorted into a plurality of bins, where each bin defines a different range of amplitudes. Signals having relatively small amplitudes may be representative of smaller particles than signals having relatively large amplitudes, for instance.

In some embodiments, a denser classification can be used for smaller pulses due to the greater variation of smaller pulses and/or greater contribution to mass than larger ones. Thus, a first subset of bins associated with smaller pulses (e.g., below a threshold amplitude level) may be separated by a first (e.g., 50 mV) interval, for example, while a second subset of bins associated with larger pulses (e.g., above a threshold amplitude level) may be separated by a second (e.g., 100 mV) interval. In an example, a plurality of bins in accordance with the present disclosure can have upper limits of 30 mV, 50 mV, 100 mV . . . 700 mV, 800 mV, and 1V. In some embodiments, a maximum amplitude threshold level (e.g., 1V) can be set such that signals exceeding the amplitude threshold can be discarded. For example, extremely large particles may impart large, undesirable variations in dust sensing.

Computing device 110 can determine a respective quantity of signals associated with each bin. That is, a count of signals falling within each bin can be determined. Each bin can be assigned a value. For example, a first bin with an upper limit of 30 mV can be assigned a value of 1, and a second bin with an upper limit of 50 mV can be assigned a value of 2. The number of signals falling into the bins can be multiplied by the bin value to allow the determination of a signal count number. In the example, 2 pulses falling in the first bin and 2 pulses falling in the second bin would yield a signal count of 6.

Computing device 110 can determine an average summation of the first plurality of signals. In some embodiments, a total summation of all amplitude bins multiplied by the signal count number can be determined. A moving average of that summation can be determined at a particular interval over a particular period of time. In some embodiments, a moving average can be determined every second over a period of ten seconds. This average summation of the first plurality of signals is sometimes referred to herein as "sigma_nv."

In a formula, two coefficients can be used: a density factor (k) that relates to average dust density, and a shape coefficient (a) that describes particle shape. In some embodiments, the shape coefficient can be set at 1 for ease of calculation. To determine a "fictional" concentration, C, the computing device 110 can multiply sigma_nv by the density factor:

$$C = k \sum_{i=1}^{q} N(v_i) v_i^a$$

where N is the signal count and $v_i$ is pulse amplitude.

In some embodiments, computing device 110 can use another moving average over a particular period of time to stabilize the fictional mass concentration. That is, the sigma_nv can be determined every second, for example, over a period of 30 seconds to determine a moving average. A known standard reference, such as a determined concentration in identical settings from another dust sensor (e.g., a reference sensor) known to provide accurate sensing, can be compared with the fictional concentration. Computing device 110 can perform a curve fitting calibration between the fictional concentration and the known (reference) concentration to determine the coefficients in a linear and/or polynomial fashion. Those coefficients can be used to calibrate the sigma_nv to mass concentration and can be stored in the memory 112, for instance, and/or on memory (e.g., EEPROM) of the PCB.

Once calibrated, the system 100 can be used to sense dust. That is, the system 100 can receive a second plurality of electronic signals from the photodetector 108 over a period of time subsequent to the calibration, the second plurality of electronic signals associated with a second plurality of particles, and determine a mass concentration of the second plurality of particles based on the second plurality of electronic signals.

Figure 2:
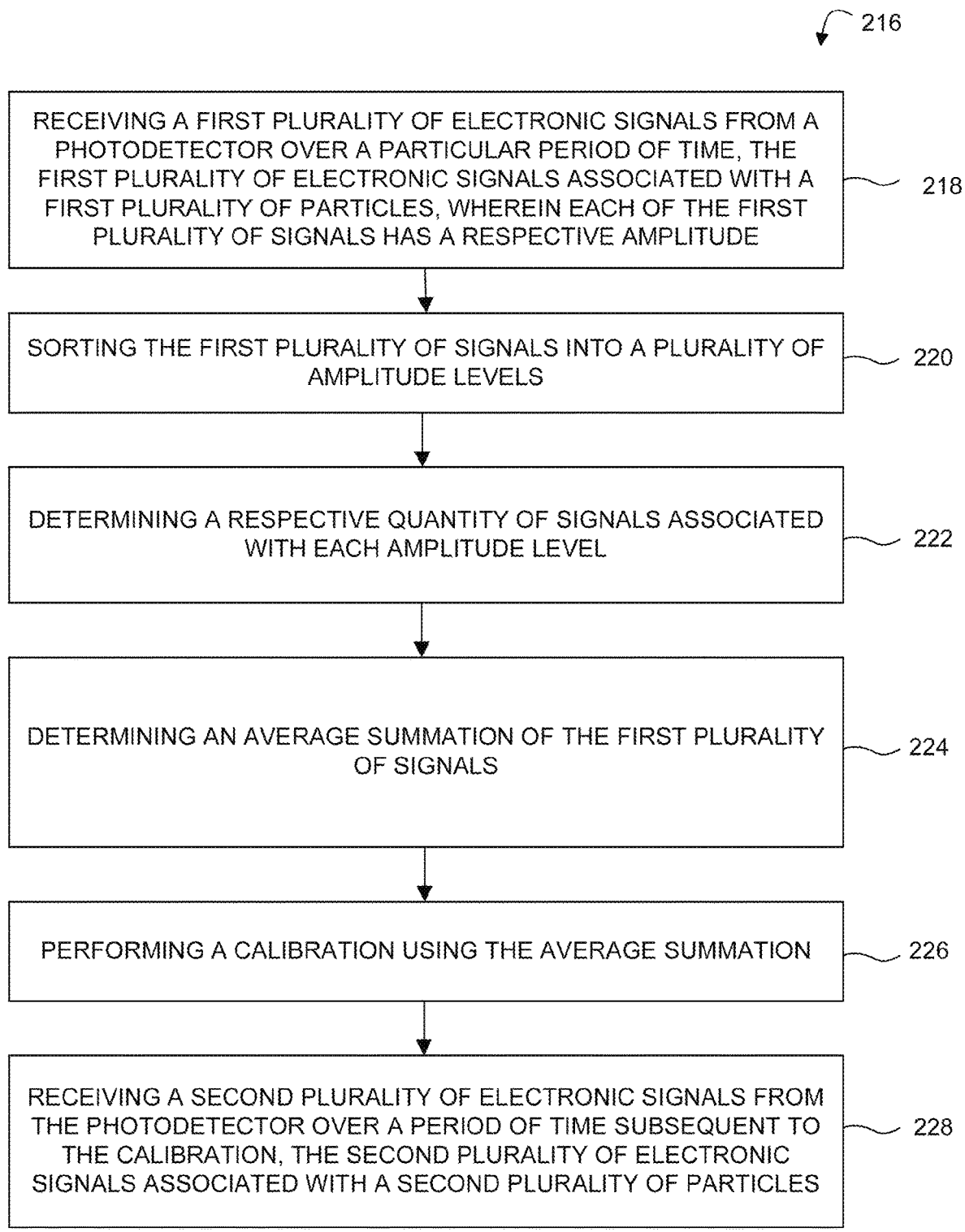
FIG. 2 illustrates a method for sensing particulate matter in accordance with one or more embodiments of the present disclosure.

FIG. 2 illustrates a method 216 for sensing particulate matter in accordance with one or more embodiments of the present disclosure. Method 216 can be performed by a computing device (e.g., computing device 110, previously described in connection with FIG. 1), for instance.

At block 218, method 216 includes receiving a first plurality of electronic signals from a photodetector over a particular period of time, the first plurality of electronic signals associated with a first plurality of particles, wherein each of the first plurality of signals has a respective amplitude. Each signal can have a unique shape consisting of a positive voltage crest and a negative voltage crest. In some embodiments, there may be a DC offset baseline in between the positive (upward) and negative (downward) crests. Method 216 can include determining the DC offset by averaging a plurality of samples (received signals) when the laser is turned down to a power level below a particular threshold and the signal is not scattered, for instance. Then, peak values of the signals can be tracked when the signal voltage crosses the DC offset plus a predefined "noise" threshold.

At block 220, method 216 includes sorting the first plurality of signals into a plurality of amplitude levels (e.g., bins). The peak amplitudes can be sorted into a plurality of bins, where each bin defines a different range of amplitudes. Signals having relatively small amplitudes may be representative of smaller particles than signals having relatively large amplitudes, for instance.

In some embodiments, a denser classification can be used for smaller pulses due to the greater variation of smaller pulses and/or greater contribution to mass than larger ones. Thus, bins associated with smaller pulses may be separated by a 50 mV interval, for example, while bins associated with larger pulses may be separated by a 100 mV interval. In some embodiments, a maximum amplitude threshold level (e.g., 1V) can be set such that signals exceeding the amplitude threshold can be discarded.

At block 222, method 216 includes determining a respective quantity of signals associated with each amplitude level. Each bin can be assigned a value. For example, a first bin with an upper limit of 30 mV can be assigned a value of 1, and a second bin with an upper limit of 50 mV can be assigned a value of 2. The number of signals falling into the bins can be multiplied by the bin value to allow the determination of a signal count number. In the example, 2 pulses falling in the first bin and 2 pulses falling in the second bin would yield a signal count of 6.

At block 224, method 216 includes determining an average summation of the first plurality of signals. In some embodiments, a total summation of all amplitude bins multiplied by the signal count number can be determined. A moving average of that summation can be determined at a particular interval over a particular period of time. In some embodiments, a moving average can be determined every second over a period of ten seconds. As previously discussed, this average summation of the first plurality of signals can be referred to as "sigma_nv."

At block 226, method 216 includes performing a calibration using the average summation. A curve fitting calibration can be performed between the fictional concentration and the known (reference) concentration to determine coefficients in a linear and/or polynomial fashion. Those coefficients can be used to calibrate the sigma_nv to mass concentration and can be stored in memory, for instance (e.g., EEPROM of the PCB).

At block 228, method 216 includes receiving a second plurality of electronic signals from the photodetector over a period of time subsequent to the calibration, the second plurality of electronic signals associated with a second plurality of particles. Once calibrated, the system can be used to sense dust. That is, the system can receive a second plurality of electronic signals from the photodetector over a period of time subsequent to the calibration, the second plurality of electronic signals associated with a second plurality of particles. At block 230, method 216 includes determining a mass concentration of the second plurality of particles based on the second plurality of electronic signals. Such determination can be carried out in a manner analogous to the determination of the first plurality of particles using the determined coefficients, for instance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for sensing particulate matter, comprising:
an air fluid tunnel;
a fan;
a laser diode;
a photodetector; and
a computing device having a processor and a memory storing instructions which, when executed by the processor, cause the processor to:
receive a first plurality of electronic signals from the photodetector over a particular period of time, the first plurality of electronic signals associated with a first plurality of particles, wherein each of the first plurality of electronic signals has a respective amplitude;
sort the first plurality of electronic signals into a plurality of amplitude levels;
determine a respective quantity of signals associated with each amplitude level;
determine an average summation of the first plurality of electronic signals;
perform a calibration using the average summation;
receive a second plurality of electronic signals from the photodetector over a period of time subsequent to the calibration, the second plurality of electronic signals associated with a second plurality of particles; and
determine a mass concentration of the second plurality of particles based on the second plurality of electronic signals.

2. The system of claim 1, wherein the instructions include instructions to determine a DC offset by averaging a plurality of signals when the laser diode is operating at a power level below a particular threshold.

3. The system of claim 1, wherein each amplitude level of a first subset of the plurality of amplitude levels is separated by a first interval, and each amplitude level of a second subset of the plurality of amplitude levels is separated by a second interval.

4. The system of claim 1, wherein each amplitude level of the plurality of amplitude levels is assigned a different value.

5. The system of claim 1, wherein the average summation includes a moving average summation of each the amplitude levels multiplied by a respective quantity of signals in each amplitude level at a particular interval over a period of time.

6. The system of claim 1, wherein the instructions include instructions to determine a fictional mass concentration of the first plurality of particles by multiplying the average summation by a density factor.

7. The system of claim 6, wherein the instructions include instructions to compare the determined fictional mass concentration to a determined reference mass concentration, wherein the determined reference mass concentration is determined by a reference sensor while the fictional mass concentration is determined.

8. The system of claim 6, wherein the instructions to perform the calibration include instructions to perform a curve fitting calibration between the determined fictional mass concentration and a determined reference mass concentration, wherein the determined reference mass concentration is determined by a reference sensor while the fictional mass concentration is determined.

9. The system of claim 8, wherein the instructions include instructions to:
determine a plurality of coefficients from the curve fitting calibration; and
store the determined plurality of coefficients in a memory of a printed circuit board associated with the photodetector.

10. The system of claim 1, wherein the instructions include instructions to control a respective operation of each of:
the fan;
the laser diode; and
the photodetector.

* * * * *